US010264604B2

(12) United States Patent
Zhang et al.

(10) Patent No.: US 10,264,604 B2
(45) Date of Patent: Apr. 16, 2019

(54) METHODS USED IN TERMINAL DEVICES AND NETWORK DEVICES, AND ASSOCIATED DEVICES

(71) Applicant: Telefonaktiebolaget LM Ericsson (publ), Stockholm (SE)

(72) Inventors: Zhan Zhang, Beijing (CN); Gen Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 266 days.

(21) Appl. No.: 15/032,305

(22) PCT Filed: Apr. 21, 2016

(86) PCT No.: PCT/CN2016/079880
§ 371 (c)(1),
(2) Date: Apr. 26, 2016

(87) PCT Pub. No.: WO2017/054438
PCT Pub. Date: Apr. 6, 2017

(65) Prior Publication Data
US 2017/0311349 A1    Oct. 26, 2017

(51) Int. Cl.
*H04W 74/08*    (2009.01)
*H04L 5/00*    (2006.01)
*H04W 16/14*    (2009.01)
*H04W 74/04*    (2009.01)

(52) U.S. Cl.
CPC ....... *H04W 74/0808* (2013.01); *H04L 5/0005* (2013.01); *H04W 16/14* (2013.01); *H04W 74/04* (2013.01)

(58) Field of Classification Search
CPC . H04W 74/0808; H04W 16/14; H04W 74/08; H04L 5/005
See application file for complete search history.

(56) References Cited

U.S. PATENT DOCUMENTS

2013/0230010 A1    9/2013  Kim et al.
2014/0086293 A1    3/2014  Koike
2014/0362780 A1    12/2014 Malladi et al.
(Continued)

FOREIGN PATENT DOCUMENTS

CN    101621317 A    1/2010
WO    2015/022577 A1    2/2015

OTHER PUBLICATIONS

Extended European Search Report for Application No. 16847578.8, dated Oct. 11, 2017, 6 pages.
(Continued)

*Primary Examiner* — Gbemileke J Onamuti
(74) *Attorney, Agent, or Firm* — Nicholson De Vos Webster & Elliott LLP

(57) ABSTRACT

The present disclosure relates to a method used in a terminal device, and the associated terminal device. The method comprises: obtaining a pattern for UL transmission to a network device, the pattern being specific to the terminal device and specifying a plurality of time points for transmitting a UL signal to the network device; and transmitting the UL signal to the network device based on the pattern. The present disclosure further relates to a method used in a network device, and the associated network device.

19 Claims, 12 Drawing Sheets

(56) References Cited

U.S. PATENT DOCUMENTS

| | | | |
|---|---|---|---|
| 2014/0362796 A1* | 12/2014 | Seo | H04L 1/1854 |
| | | | 370/329 |
| 2015/0049624 A1* | 2/2015 | Sun | H04W 72/082 |
| | | | 370/252 |
| 2016/0338096 A1* | 11/2016 | Vajapeyam | H04L 1/1861 |
| 2017/0099125 A1* | 4/2017 | Bengtsson | H04L 5/0048 |
| 2017/0195126 A1* | 7/2017 | Brooks | H04B 10/69 |

OTHER PUBLICATIONS

International Search Report and Written Opinion for Application No. PCT/CN2016/079880, dated Jan. 20, 2017, 12 pages.
International Preliminary Report on Patentability for Application No. PCT/CN2016/079880, dated Aug. 8, 2018, 26 pages.

* cited by examiner

METHODS USED IN TERMINAL DEVICES AND NETWORK DEVICES, AND ASSOCIATED DEVICES

CROSS-REFERENCE TO RELATED APPLICATIONS

This application is a National stage of International Application No. PCT/CN2016/079880, filed Apr. 21, 2016, which is hereby incorporated by reference.

TECHNICAL FIELD

The present disclosure generally relates to the technical field of wireless communications, and particularly, to a method used in a terminal device and the associated terminal devices, and to a method used in a network device and the associated network devices.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Given the explosive growth of data traffic, the existing licensed spectrum is far from enough to provide satisfactory user experience and/or cost efficiency. In addition to the exclusive licensed spectrum, some shared, unlicensed spectrum may also be required. The 3rd Generation Partner Project (3GPP) has proposed to extend the Long Term Evolution (LTE) access technology to unlicensed spectrum. Licensed Assisted Access (LAA)-LTE (LAA-LTE) has been provided as one solution. The LAA-LTE utilizes an unlicensed spectrum as a performance booster managed by a licensed carrier. The traditional carrier aggregation framework used for licensed carriers can be reused in the LAA-LTE. A licensed LTE carrier is used for all mobility, control signaling and parts of the user data, while one or more carriers in an unlicensed spectrum are used to boost the user-data performance. For Release 13, DownLink (DL) data transmission in an unlicensed spectrum is supported and UL is also discussed. When coming to Release 14, UL data transmission in an unlicensed spectrum will be supported as well.

In the current cellular operation in an unlicensed band, e.g., in the LAA-LTE system, there are two steps for accomplishing UL data transmission. The first step is that a network device (e.g., a Base Station (BS)) makes a UL grant to let a terminal device (e.g., a User Equipment (UE)) know at which resource it should transmit data. In the second step, UE transmits UL data in the granted resource. Note that the same UL resource could be allocated to one or more UEs with a possible better efficiency when with listen-before-talk mechanism.

For the second step in the UL data transmission, Listen Before Talk (LBT) is done at UE side to avoid collision. In other words, UL transmission is subject to LBT success. Taking the LAA-LTE system as an example, the LBT operates as a MAC protocol in a radio node of LAA-LTE in the following way. First of all, the higher layer of UE firstly sends a data transmission request to its MAC layer. Before data is sent to physical layer for transmission over a wireless channel (e.g., a radio frequency band involving one or more continues or discontinues radio sub-bands or sub-carriers), the UE's receiver is activated to listen to the wireless channel. This may be referred to as a LBT success, if a radio frequency signal power listened over the wireless channel is less than a predetermined threshold. Otherwise, the receiver waits for a random time interval and then listens again. This receiver continues this listening after this random time interval, until the wireless channel is not occupied by other device or system. Once the UE's transmitter starts to transmit, it transmits the entire data frame without any stop even if collision occurs during the transmission.

FIG. 1 shows an example of UL LBT. As shown, the Channel Clearance Assessment (CCA) period (the left diagonal part) is used for UE to perform LBT. When a channel being sensed busy in the first UL granted subframe, i.e., subframe n in this example, UL data transmission does not take place for this subframe (denoted with a cross). In other words, the UL data transmission does not happen even when receiving UL grant at UE side. Then, when a channel is sensed as idle in the second sub-frame (e.g., subframe n+1 in this example), UL data is transmitted from UE side (denoted as the right diagonal part).

In a typical scenario involving the LAA-LTE and Wireless Fidelity (Wi-Fi) coexistence, it is possible that no UL data transmission happens even when an UL grant is sent from BS side.

SUMMARY

In general, regarding either LAA or standalone contention based access at unlicensed channels, increasing the granted UE number for same overlapped radio resource at UL Multi-User (MU) Transmission (TX) is a tool to increase the spectrum utility. In this case, BS needs to perform multi-user MIMO reception. The challenge brought by this UL MU grants is that number of UEs and their respective starting time points to actually conduct UL TX is completely unpredictable due to the LBT kind of procedure. Only the maximum number of UL UEs is known to the BS side.

FIG. 2 illustrates an example of UL MU transmission. As shown, three terminal devices, i.e., UE1, UE2 and UE3, are configured with a MU UL grant sharing the same radio resource. However, they may face different radio environments and may start to transmit at different time points when a CCA succeeds or there is no UL transmission due to failure of CCA. To be specific, UL MU reception of contention based signal TX has to face difficulties as follows: (i) signals from different UEs may not be time aligned due to the back-off of a required LBT procedure; and (ii) the number of time-overlapping signals from different UEs is uncertain (though the maximum number of UEs is known) when receiving the signals, because some granted UEs may not send expected signals due to the contention mechanism. These could increase complexity of UE's receiver in terms of, e.g., Channel State Indicator (CSI) estimation, detection of possible signals sources, and suppression of inter-MU interferences.

It is in view of at least one of the above considerations and others that the various embodiments of the present technology have been made. The present disclosure proposes to introduce a certain time/frequency pattern for specifying the beginning of any UL transmission, so as to facilitate identifying UE(s) that has actually conducted UL transmission.

According to a first aspect of the present disclosure, there is provided a method used in a terminal device. The method includes: obtaining a pattern for UL transmission to a network device, the pattern being specific to the terminal device and specifying a plurality of time points for transmitting a UL signal to the network device; and transmitting the UL signal to the network device based on the pattern.

In an embodiment, said transmitting the UL signal to the network device based on the pattern includes: determining one time point from the plurality of time points based on UL transmission grant for the terminal device; performing a CCA during a predetermined time period immediately preceding the determined time point; and transmitting the UL signal to the network device at the determined time point if the CCA succeeds.

In an embodiment, said transmitting UL signals to the network device based on the pattern further includes: if the CCA fails, performing another CCA during the predetermined time period immediately preceding another time point specified by the pattern.

In an embodiment, said obtaining the pattern for the UL transmission includes receiving an indication of the pattern from the network device; and determining the pattern from a set of predefined patterns based on the indication by network device.

In an embodiment, said obtaining the pattern for the UL transmission includes receiving a set of predefined patterns from the network device; and selecting, from the set of predefined patterns, one pattern as the pattern for the UL transmission.

In an embodiment, the UL signal contains a reference signal as its header.

In an embodiment, the plurality of time points specified by the pattern are equally spaced.

According to a second aspect of the present disclosure, there is provided a method used in a network device. The method includes: detecting a UL signal at a time point specified by a pattern, where the pattern specifies a plurality of time points for a terminal device to transmit its UL signal to the network device; and identifying that the UL signal comes from the terminal device based on the pattern.

In an embodiment, the method further includes: assigning the pattern to the terminal device; and transmitting an indication of the pattern to the terminal device.

In an embodiment, the method further includes: transmitting a set of predefined patterns including the pattern to the terminal device; and receiving, from the terminal device, an indication that the terminal device selects the pattern for transmitting its UL signal to the network device.

In an embodiment, the time points specified by the pattern are equally spaced.

According to a third aspect of the present disclosure, there is provided a terminal device. The terminal device includes an obtaining unit configured to obtain a pattern for UL transmission to a network device, wherein the pattern is specific to the terminal device and specifies a plurality of time points for transmitting a UL signal to the network device; and a transmitting unit configured to transmit the UL signal to the network device based on the pattern.

According to a fourth aspect of the present disclosure, there is provided a network device. The network device includes: a detecting unit configured to detect a UL signal at a time point specified by a pattern, where the pattern specifies a plurality of time points for a terminal device to transmit its UL signal to the network device; and an identifying unit configured to identify that the UL signal comes from the terminal device based on the pattern.

According to a fifth aspect of the present disclosure, there is provided a terminal device. The terminal device includes: a processor; and a memory storing instructions that when executed on the processor, cause the terminal device to: obtain a pattern for UL transmission to a network device, where the pattern is specific to the terminal device and specifies a plurality of time points for transmitting a UL signal to the network device; and transmit the UL signal to the network device based on the pattern.

According to a sixth aspect of the present disclosure, there is provided a network device. The network device includes: a processor; and a memory storing instructions that when executed on the processor, cause the network device to: detect a UL signal at a time point specified by a pattern, the pattern specifies a plurality of time points for a terminal device to transmit its UL signal to the network device; and identify that the UL signal comes from the terminal device based on the pattern.

According to a seventh aspect of the present disclosure, there is provided a computer program product storing instructions that when executed, cause one or more computing devices to perform the method of the first or the second aspect.

The above embodiments of the first aspect are also applicable for the third, the fifth and the seventh aspects. The above embodiments of the second aspect are also applicable for the fourth, the sixth and the seventh aspects.

With the embodiments of the present disclosure, the use of the pattern specifying a plurality of time points for transmitting a UL signal to the network device allows the network device to identify one or more terminal devices that have actually conducted UL transmissions. This can facilitate UL MU detection at the network device, while making UL MU granting feasible for massive commercial deployment.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
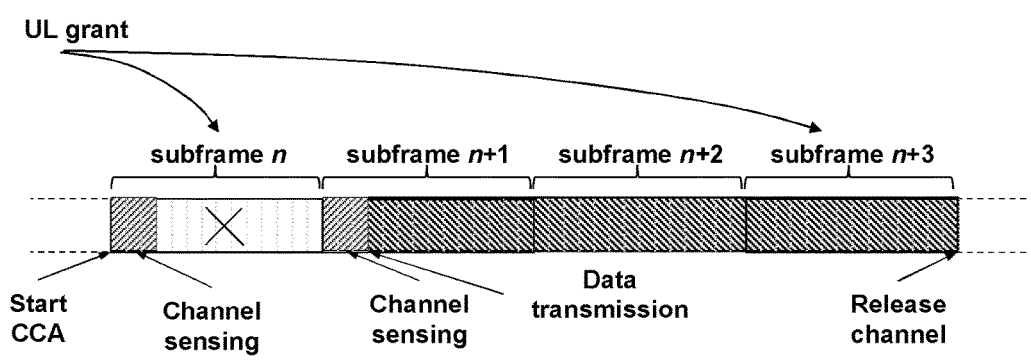
FIG. 1 shows an example of transmission cancellation for UL LBT.
Figure 2:
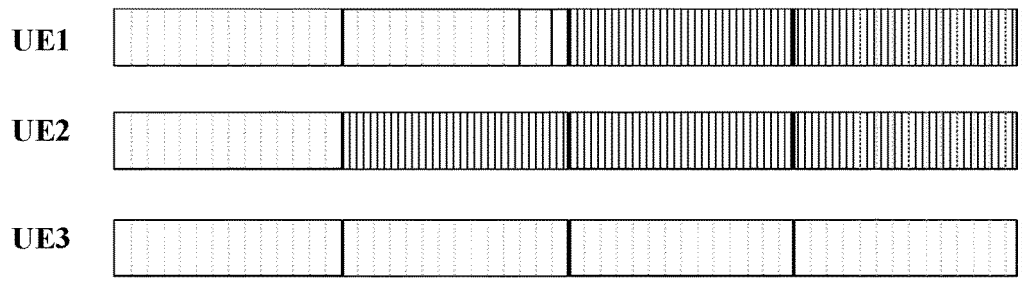
FIG. 2 illustrates an example of UL MU transmission.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

As used herein, the term "terminal device" refers to any end device that can access a wireless communication network and receive services therefrom. The wireless communication network may also be referred to as e.g. a wireless communications system, a communications network, a communications system, a network or a system, including, but not limited to the 5G network or any other appropriate wireless communications network operating at high frequencies. By way of example and not limitation, a terminal device may be a user equipment (UE), which may be a Subscriber Station (SS), a Portable Subscriber Station, a Mobile Station (MS), or an Access Terminal (AT). The terminal device may include, but is not limited to, a mobile phone, a cellular phone, a smart phone, a tablet, a wearable device, a personal digital assistant (PDA), and the like.

The term "network device" refers to a device at the network side and may include a network device via which a terminal device accesses the network and receives services therefrom. By way of example, such a network device may be a base station (BS), a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to include one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The present disclosure proposes to predefine, at a network device, different patterns for different terminal devices' possible data transmissions, when the network device issues UL grants to the corresponding terminal devices. This could make each UL transmission of UEs always start at a certain possible time point so that detection of MU UL signals can be dramatically simplified.

As used herein, the term "pattern" refers to a specific set of possible TX starting points, at each of which a terminal device may start its UL transmission to a corresponding network device. In other words, the term "pattern" specifies a plurality of time points for a terminal device transmitting a UL signal to a corresponding network device. The possible TX starting points as described by a pattern may be equivalently referred to as "time points" for simplification.

Figure 3:
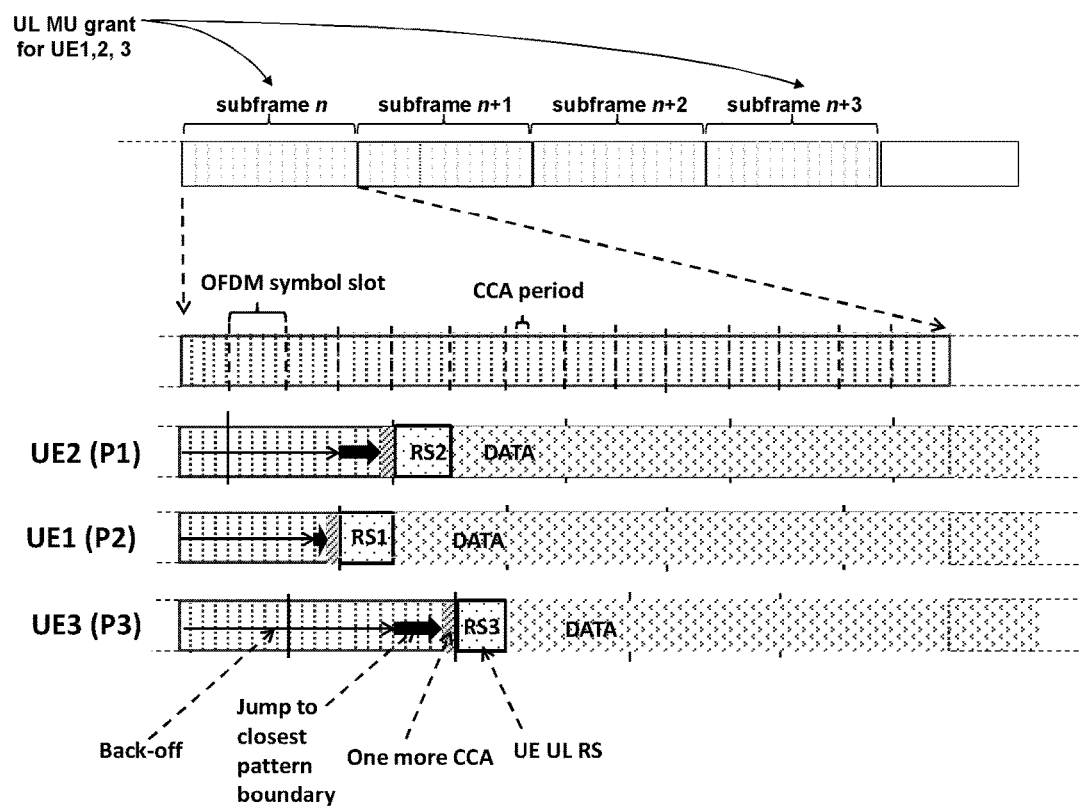
FIG. 3 illustrates three exemplary patterns according to the present disclosure.

FIG. 3 illustrates three exemplary patterns according to the present disclosure. As illustrated, three patterns, i.e., P1, P2 and P3 are described. For example, P3 specifies four or even more possible TX starting points, at each of which a terminal device (i.e., UE3 in this example), to which P3 is dedicated, may transmit a UL signal to its corresponding network device. In order to facilitate the network device in identifying each terminal device's UL signal, it is preferable that each pattern should be specific to each terminal device, i.e., should be unique to each terminal device. For example, P1, P2 and P3 are specific to UE2, UE1 and UE3, respectively. Then, each TX starting point for a terminal device would not be overlapped with another terminal device's TX starting points. In other words, there are time shifts between a series of time points specified by a pattern and a series of time points specified by another patter.

With the patterns, e.g., P1, P2 and P3, as shown in FIG. 3, the network device may try to schedule three terminal devices, e.g., UE1, UE2 and UE3, to have a MU UL TX for subframes n, n+1, n+2 and n+3. Taking UE3 as an example, when one CCA of UE3 succeeds but does not reach any time point as specified by P3, UE3 will wait until a CCA period, i.e., a predetermined time period for CCA, which is usually smaller than an OFDM symbol. The CCA period should immediately precede one time point following a UL transmission time point specified by the received UL transmission grant for UE3. The CCA period is denoted as the small dashed part (explained in "one more CCA") in FIG. 3. Then, UE3 performs a CCA during the CCA period. In this example, the CCA successes (i.e., channel is identified to be idle during the CCA period), and then UE3 transmits a reference signal to the network device during the RS3 period. Herein, RS3 is denoted as a time period for UE3 transmitting a reference signal to the network device, and the starting time point of the RS3 period is one time point as specified by P3 for UE3 transmitting a UL signal to the network device.

According to the normal LBT procedure, if another CCA fails, i.e., channel is busy, UE3 is required to have a back-off to realize LBT for unlicensed bands, as denoted by the bold arrow. That is, if channel is busy, a back-off timer will choose a new back-off value and then continues to count down until channel becomes free again (i.e., until another CCA period immediately preceding a time point specified by P3). The details on how to choose a new back-off back should be known in the art, and will be omitted here for sake of brief.

In an embodiment, a fixed number of CCA periods (e.g., 4) may be set before each time point as specified by the pattern. In this embodiment, UL transmission happens only when the whole CCA session (e.g., all four CCAs during the all 4 CCA periods) succeeds.

Although in FIG. 3, each pattern specifies a plurality of time points for transmitting a reference signal, it will be appreciated that a pattern specifying a plurality of time points for transmitting a UL signal other than a reference signal could be also applied in the present disclosure. For example, the UL signal could be a preamble signal.

Figure 4:
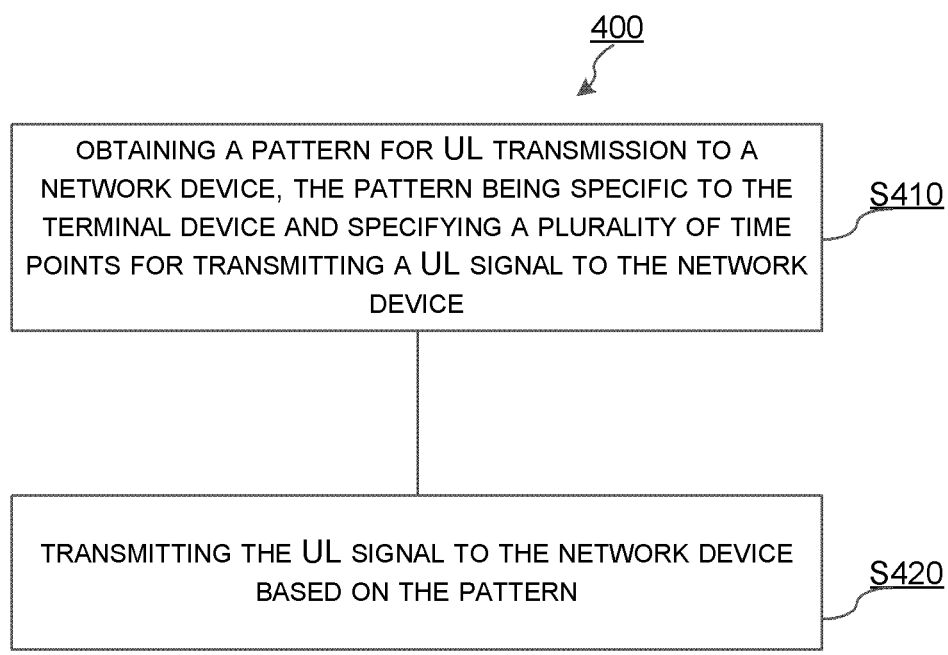
FIGS. 4-7 schematically illustrate a method 400 used in a terminal device according to embodiments of the present disclosure.

FIG. 4 schematically illustrates a method 400 used in a terminal device according to embodiments of the present disclosure.

At block S410, the terminal device obtains a pattern for UL transmission to a network device. The pattern is specific to the terminal device and specifies a plurality of time points for transmitting a UL signal to the network device. P1, P2 or P3 as shown in FIG. 3 may be used as an example of the pattern.

In an embodiment, the plurality of time points specified by the pattern are equally spaced, as illustrated in FIG. 3. Alternatively, the plurality of time points specified by the pattern may be randomly spaced, as long as they are not overlapped with time points specified by other patterns.

At block S420, the terminal device transmits the UL signal to the network device based on the pattern. For example, the UL signal contains a reference signal as its header.

Figure 5:
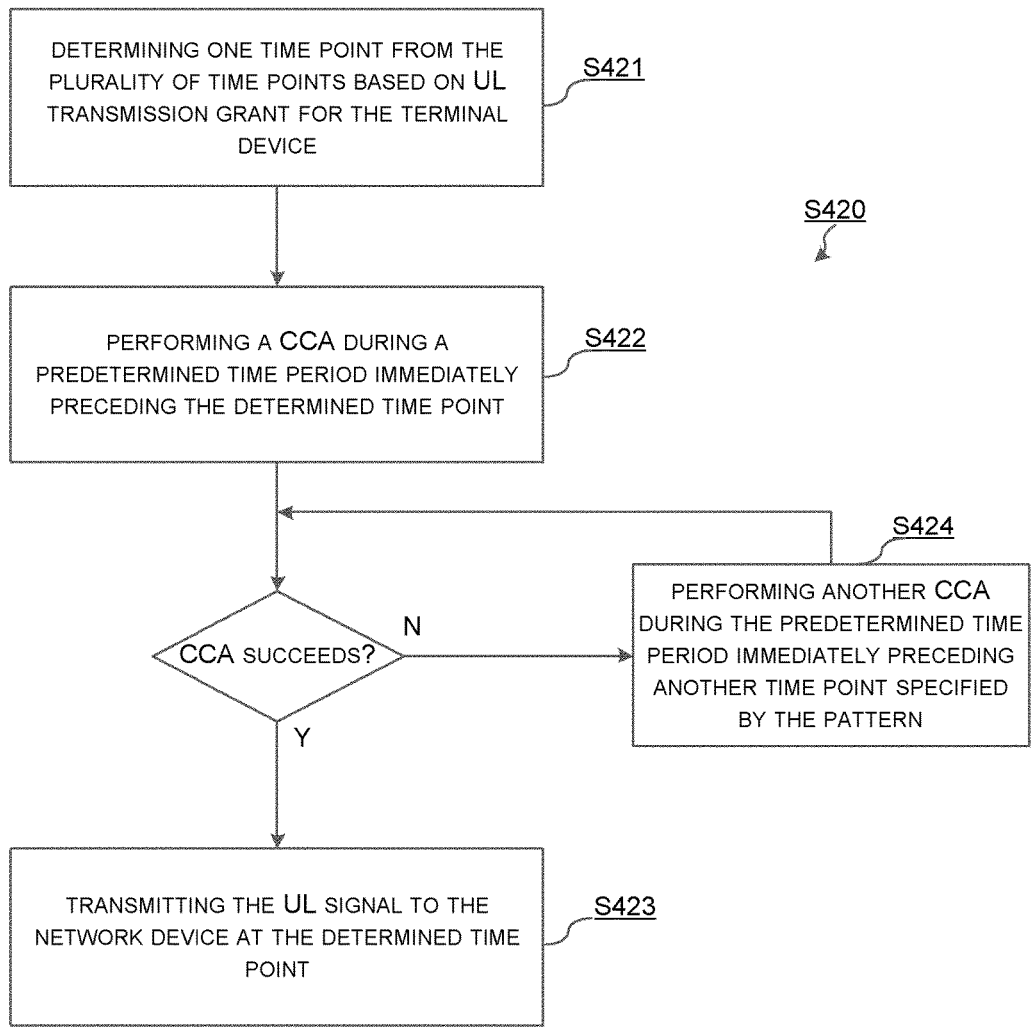

In an embodiment, block S420 may be implemented as shown in FIG. 5.

At block S421, the terminal device determines one time point from the plurality of time points based on UL transmission grant for the terminal device. For example, the determined time point may be one of the plurality of time points as specified by the pattern, which is closest to and follows a UL transmission time point specified by the received UL transmission grant for the terminal device. The starting point of RS3 in FIG. 3 may be an example of the determined time point.

At block S422, the terminal device performs a CCA during a predetermined time period immediately preceding the determined time point. As used herein, the predetermined time period refers to a CCA period. According to the present disclosure, the CCA period may have either a fixed time length or a variable time length. Taking FIG. 3 as an example, UE3 performs a CCA in the CCA period immediately preceding the starting point of the RS3 period.

Then, the method 400 proceeds to a judgment block, where it is judged whether the CCA succeeds or not.

If the CCA succeeds, the method 400 proceeds along the "Y" branch of the judgment block to block S423. At block S423, the terminal device transmits the UL signal to the network device at the determined time point. For example, UE3 transmits a reference signal to the network device during the RS3 period in FIG. 3.

If the CCA fails, the method 400 proceeds along the "N" branch of the judgment block to block S424. At block S424, the terminal device performs another CCA during the predetermined time period immediately preceding another time point specified by the pattern. In an example, when the CCA fails, there may be a back-off, and then the terminal device needs to determine another time point based on the pattern by considering the back-off. After block S424, the method 400 will return to the judgment block.

Figure 6:
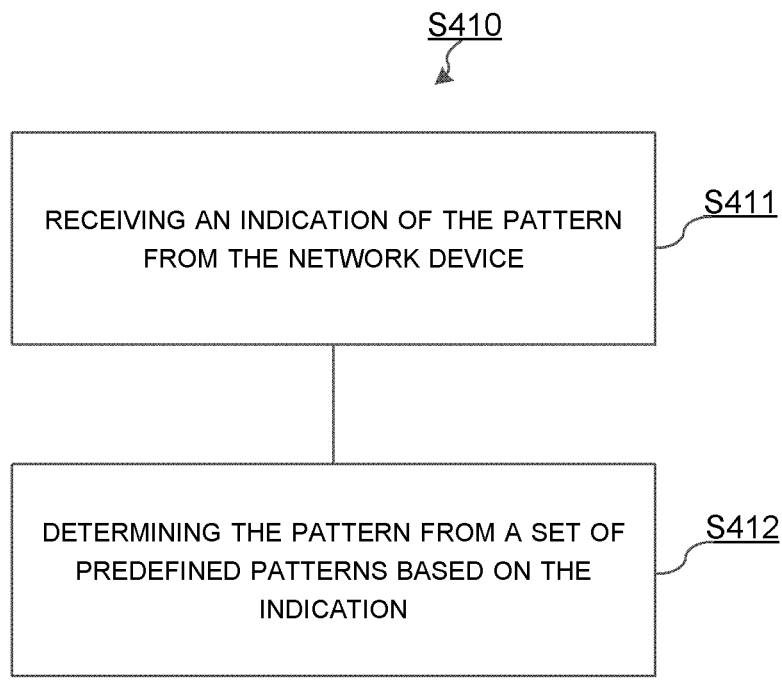

In an embodiment, block S410 may be implemented as shown in FIG. 6.

At block S411, the terminal device receives an indication of the pattern from the network device.

At block S412, the terminal device determines the pattern from a set of predefined patterns based on the indication.

According to this embodiment, the set of predefined patterns should be known to both the terminal device and the network device in advance, and it is the network device which selects a pattern for the terminal device to follow. For example, the indication of the pattern may be received from the network device via a DL instruction signaling, such as in a new field in LTE-like Downlink Control Information (DCI) or at UL grants.

Figure 7:
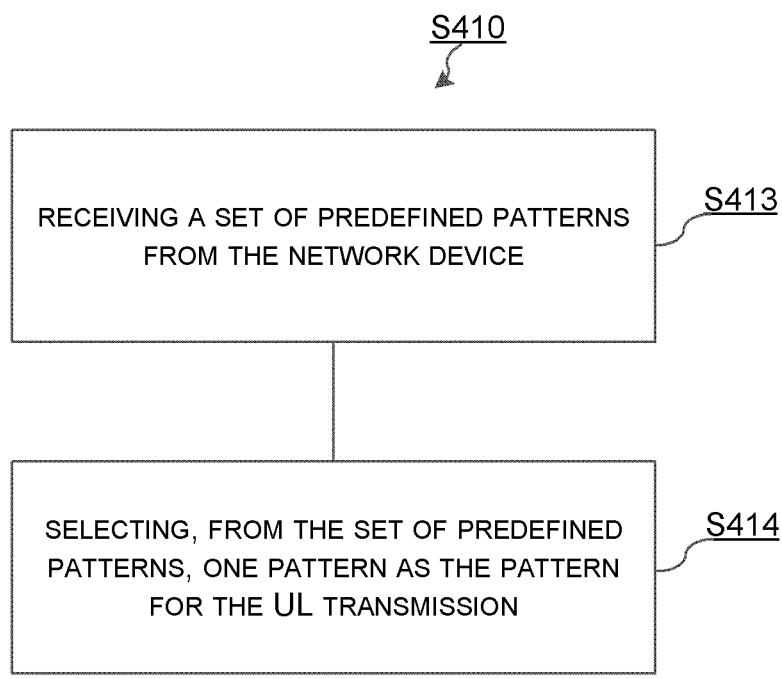

In another embodiment, block S410 may be implemented as shown in FIG. 7.

At block S413, the terminal device receives a set of predefined patterns from the network device.

At block S414, the terminal device selects, from the set of predefined patterns, one pattern as the pattern for the UL transmission.

According to this embodiment, the set of predefined patterns should be set at the network device in advance, and then may be broadcasted in e.g., a system message to all terminal devices involved in MU UL transmissions. After receiving the set of predefined patterns, the terminal device may select one pattern from the set of predefined patterns to apply in its UL transmissions.

Figure 8:
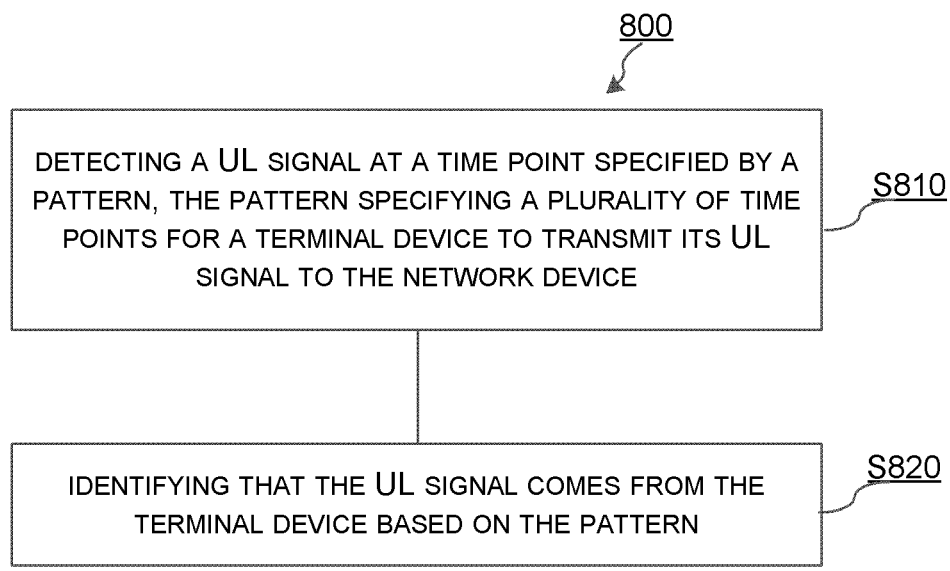
FIGS. 8-10 schematically illustrate a method 800 used in a network device according to embodiments of the present disclosure.

FIG. 8 schematically illustrates a method 800 used in a network device according to embodiments of the present disclosure.

At block S810, the network device detects a UL signal at a time point specified by a pattern. The pattern, e.g., P1, P2 or P3 as shown in FIG. 3, specifies a plurality of time points for a terminal device to transmit its UL signal to the network device.

In an embodiment, the plurality of time points specified by the pattern are equally spaced, as illustrated in FIG. 3. Alternatively, the plurality of time points specified by the pattern may be randomly spaced, as long as they are not overlapped with time points specified by other patterns.

At block S820, the network device identifies that the UL signal comes from the terminal device based on the pattern. For example, the UL signal contains a reference signal as its header.

Figure 9:
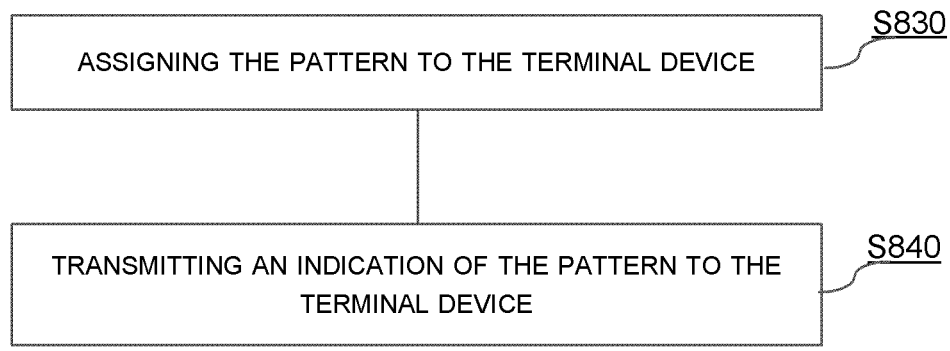

In an embodiment, the method 800 may further include blocks S830 and S840 as illustrated in FIG. 9.

At block S830, the network device assigns the pattern to the terminal device.

At block S840, the network device transmits an indication of the pattern to the terminal device.

According to this embodiment, there should be a set of predefined patterns known to both the network device and the terminal device. Then, the network device selects a pattern for the terminal device to follow, and then notifies the terminal device of the pattern by transmitting an indication of the pattern. For example, the network device may transmit the indication of the pattern via a DL instruction signaling, such as in a new field in LTE-like Downlink Control Information (DCI) or at UL grants.

Figure 10:
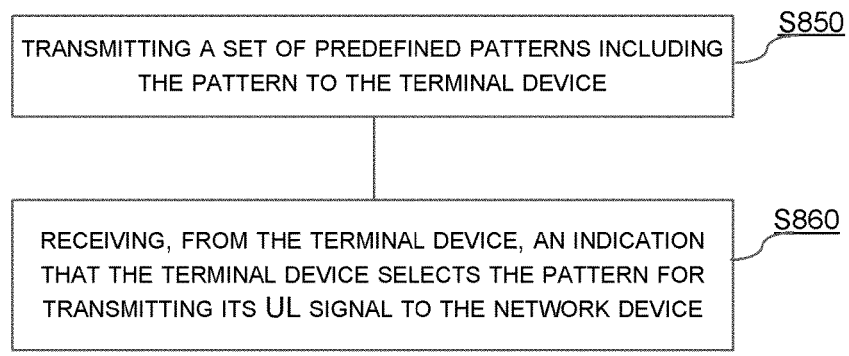

In another embodiment, the method 800 may further include blocks S850 and S860 as illustrated in FIG. 10.

At block S850, the network device transmits a set of predefined patterns including the pattern to the terminal device.

At block S860, the network device receives, from the terminal device, an indication that the terminal device selects the pattern for transmitting its UL signal to the network device.

According to this embodiment, the network device should set the set of predefined patterns in advance, and then broadcast the set in e.g., a system message to all terminal devices involved in MU UL transmissions. Then, the terminal device may select one pattern from the set of predefined patterns to apply in its UL transmissions, and transmit an indication that the terminal device selects the pattern for transmitting its UL signal to the network device.

With the method 800, the network device may only need to check a limited number of time points as specified by a pattern. Thus, it is easy for the network device to identify a signal source only by its starting points. To do this, there should be time shifts between time points specified by a pattern and time points specified by another patter. The time shifts can enable a sequential detection and MU suppression (cancellation) on definite signals without costly blind detection on source of signals and their timing.

For example, as illustrated by FIG. 3, signals from different sources (UEs) starts at a certain specific time point according to each pattern specified by the network device. The network device could easily identify that the signal in the RS1 period comes from UE1 when mapping its timing to P2 assigned to UE1. Additionally, signals from different UEs are time shifted by an integer times of OFDM signals despite the psuedo-back-off procedure.

In FIG. 3, before RS1, one more CCA is carried out. During the RS1 period, accurate CSI is estimated at the network device. Then, during the RS2 period, a signal received from UE1 is suppressed before the receiver carries channel estimation (CE) based on RS2. So on and so forth for the CE at RS3.

In this example, the network device's receiver could know UE1's signal comes first according to its starting timing, which is matching to P2 assigned to UE1. Also, it is easy to detect and identify the second signal is from UE2 after suppressing UE1's signal. It works similarly for UE3 after suppressing signals from UE1 and UE2. Thereby, the complexity in the signal processing for MU UL reception at the network device may be reduced.

Hereinafter, an algorithm will be introduced to exemplify the low-complexity signal processing according to the present disclosure.

First of all, mathematically, during the RS2 period, if the received signal is Y(t), the noise or interference items are tentatively discarded only for simplifying a formulation. Then, $Y(t)=[H1,H2](s1, s2)^t$, where matrixes H1 or H2 are equivalent channels from UE1 and UE2 respectively to the network device, including all the sub-channel signal experienced from source to detector, and s1 represents a signal from UE1 and s2 represents a signal for UE2. To suppress the component of s1, signal processing as follows can be done to get a new signal Y2(t) for detecting s2: $Y2(t)=WY(t)$ where weighting matrix $W=Arg(Min (\|WH1\|))$, or $Y2(t)=Y(t)-H1s1$, i.e., a signal cancellation that may be done after data detection of s1 and accurate channel estimation of H1. That is, Y2(t) can be used for detection of s2 after either suppression or cancellation of s1.

Secondly, similarly, in a possible UL TX of UE3, at the RS3 period, the suppression should be done on both s1 and s2. So, to get a signal sample for s3 detection, the following example processing can be done. In particular, $Y(t)=[H1, H2, H3](s1, s2, s3)t$ and $Y3(t)=W2Y(t)$ where $W2=Arg(Min (\|WH1\|+\|WH^2\|))$, or $Y3(t)=Y(t)-H1s1-H2s2$, i.e., a signal cancellation. Then, Y3(t) may be used for detection of s3.

Figure 11:
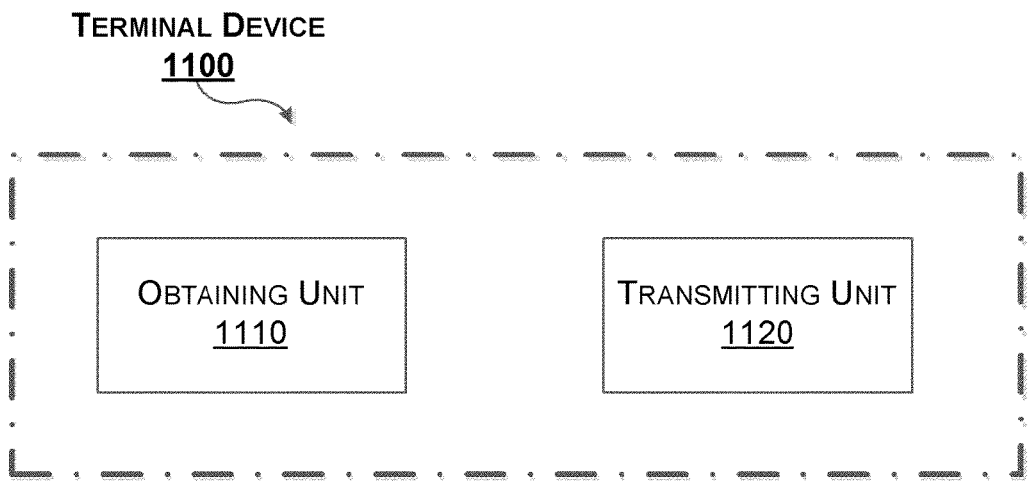
FIG. 11 is a schematic block diagram of a terminal device 1100 according to embodiments of the present disclosure.

FIG. 11 is a schematic block diagram of a terminal device 1100 according to embodiments of the present disclosure. The terminal device 1100 is to perform UL transmission to a network device.

As illustrated, the terminal device 1100 includes an obtaining unit 1110 and a transmitting unit 1120.

The obtaining unit 1110 may be configured to obtain a pattern for the UL transmission. The pattern such as P1, P2 or P3 as shown in FIG. 3 is specific to the terminal device and specifies a plurality of time points for transmitting a UL signal to the network device.

In an embodiment, the plurality of time points specified by the pattern are equally spaced, as illustrated in FIG. 3. Alternatively, the plurality of time points specified by the pattern may be randomly spaced, as long as they are not overlapped with time points specified by other patterns.

The transmitting unit 1120 may be configured to transmit the UL signal to the network device based on the pattern. For example, the UL signal contains a reference signal as its header.

In an embodiment, the transmitting unit 1120 may be further configured to: determine one time point from the plurality of time points based on UL transmission grant for the terminal device; perform a CCA during a predetermined time period immediately preceding the determined time point; and transmit the UL signal to the network device at the determined time point if the CCA succeeds.

Moreover, the transmitting unit 1120 may be further configured to: if the CCA fails, perform another CCA during the predetermined time period immediately preceding another time point specified by the pattern.

In an embodiment, the obtaining unit 1110 may be further configured to: receive an indication of the pattern from the network device; and determine the pattern from a set of predefined patterns based on the indication.

In an alternative embodiment, the obtaining unit 1110 may be further configured to: receive a set of predefined patterns from the network device; and select, from the set of predefined patterns, one pattern as the pattern for the UL transmission.

As those skilled in the art will appreciate, the above-described units may be implemented separately as suitable dedicated circuits. Nevertheless, these units can also be implemented using any number of dedicated circuits through functional combination or separation. In some embodiments, these units may be even combined in a single application specific integrated circuit (ASIC).

Figure 12:
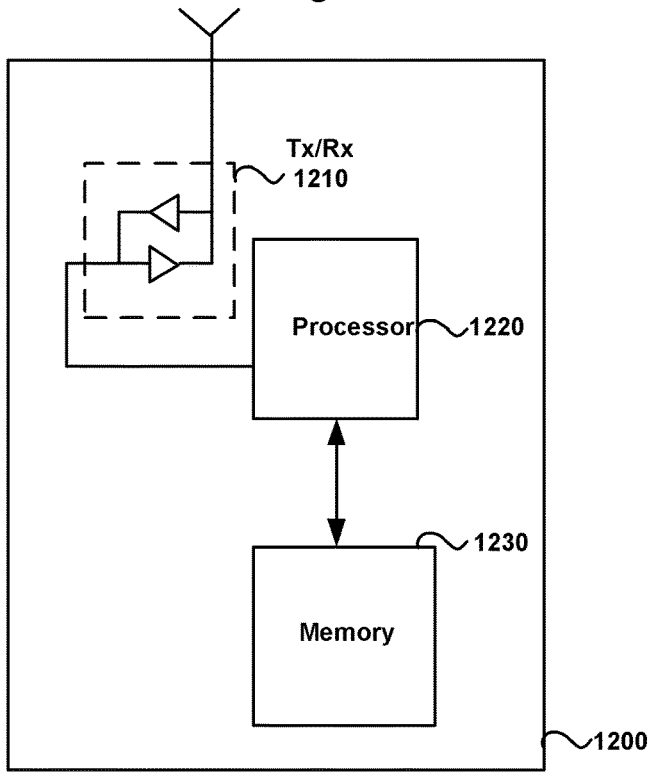
FIG. 12 is a block diagram illustrating an exemplary implementation of a terminal device according to the present disclosure

As an alternative implementation, there is provided a terminal device 1200 including a transceiver 1210, a processor 1220 (including but not limited to a microprocessor, a microcontroller or a Digital Signal Processor (DSP), etc.) coupled to the transceiver 1210 and a memory 1230 as illustrated in FIG. 12. The transceiver 1210 is for bidirectional wireless communications and has at least one antenna to facilitate communication. The memory 1230 may store machine-readable program code executable by the processor 1220. The processor 1220, when executing the machine-readable program code, controls the terminal device 1200 to perform the above-described method 400.

Figure 13:
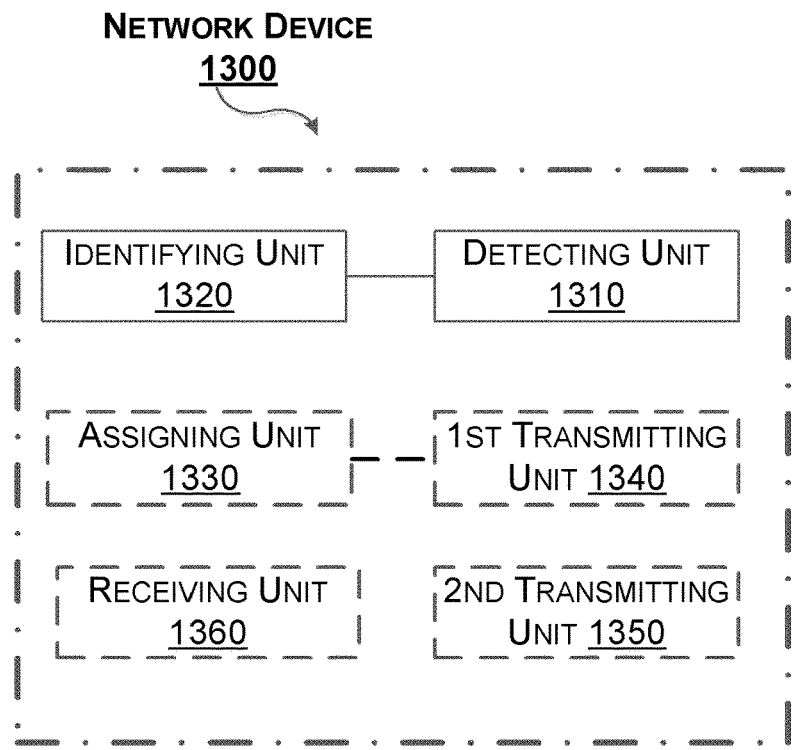
FIG. 13 is a schematic block diagram of a network device 1300 according to embodiments of the present disclosure.

FIG. 13 is a schematic block diagram of a network device 1300 according to embodiments of the present disclosure. The network device 1300 is to perform UL reception.

As illustrated, the network device 1300 includes a detecting unit 1310 and an identifying unit 1320.

The detecting unit 1310 may be configured to detect a UL signal at a time point specified by a pattern. The pattern such as P1, P2 or P3 as shown in FIG. 3 specifies a plurality of time points for a terminal device to transmit its UL signal to the network device.

In an embodiment, the plurality of time points specified by the pattern are equally spaced, as illustrated in FIG. 3. Alternatively, the plurality of time points specified by the pattern may be randomly spaced, as long as they are not overlapped with time points specified by other patterns.

The identifying unit 1320 may be configured to identify that the UL signal comes from the terminal device based on the pattern.

In an embodiment, the network device 1300 may further include an assigning unit 1330 and a first transmitting unit 1340. The assigning unit 1330 may be configured to assign the pattern to the terminal device. The first transmitting unit 1340 may be configured to transmit an indication of the pattern to the terminal device.

In another embodiment, the network device 1300 may further include a second transmitting unit 1350 and a receiving unit 1360. The second transmitting unit 1350 may be configured to transmit a set of predefined patterns including the pattern to the terminal device. The receiving unit 1360 may be configured to receive, from the terminal device, an indication that the terminal device selects the pattern for transmitting its UL signal to the network device.

It should be noted that two or more different units in this disclosure may be logically or physically combined. For example, the first transmitting unit 1340, the second transmitting unit 1350 and the receiving unit 1360 may be combined as one single unit in the network device.

As those skilled in the art will appreciate, the above-described units may be implemented separately as suitable dedicated circuits. Nevertheless, these units can also be implemented using any number of dedicated circuits through functional combination or separation. In some embodiments, these units may be even combined in a single application specific integrated circuit (ASIC).

Figure 14:
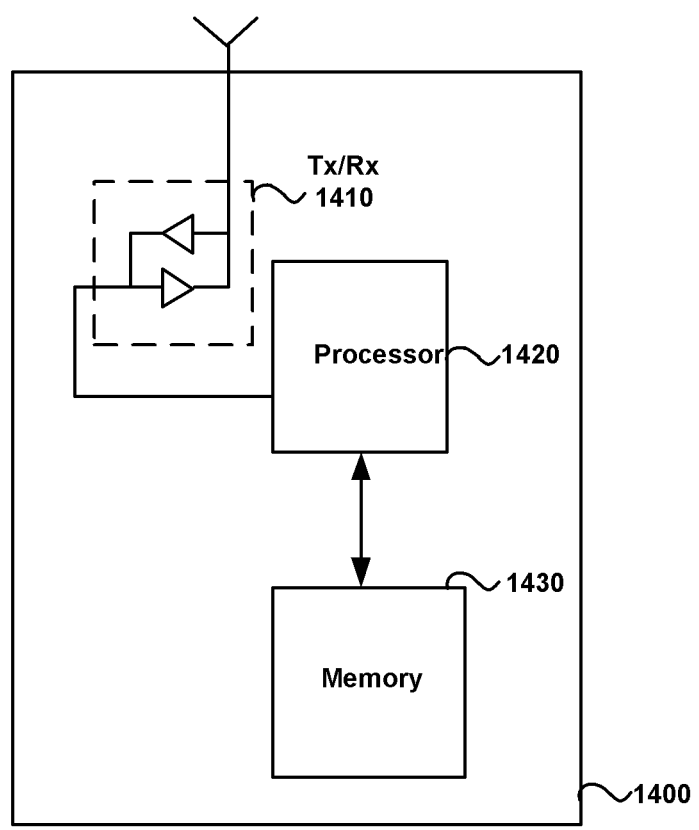
FIG. 14 is a block diagram illustrating an exemplary implementation of a network device according to the present disclosure.

As an alternative implementation, there is provided a network device 1400 including a transceiver 1410, a processor 1420 (including but not limited to a microprocessor, a microcontroller or a Digital Signal Processor (DSP), etc.) coupled to the transceiver 1410 and a memory 1430 as illustrated in FIG. 14. The transceiver 1410 is for bidirectional wireless communications and has at least one antenna to facilitate communication. The memory 1430 may store machine-readable program code executable by the processor 1420. The processor 1420, when executing the machine-readable program code, controls the network device 1400 to perform the above-described method 800.

Figure 15:
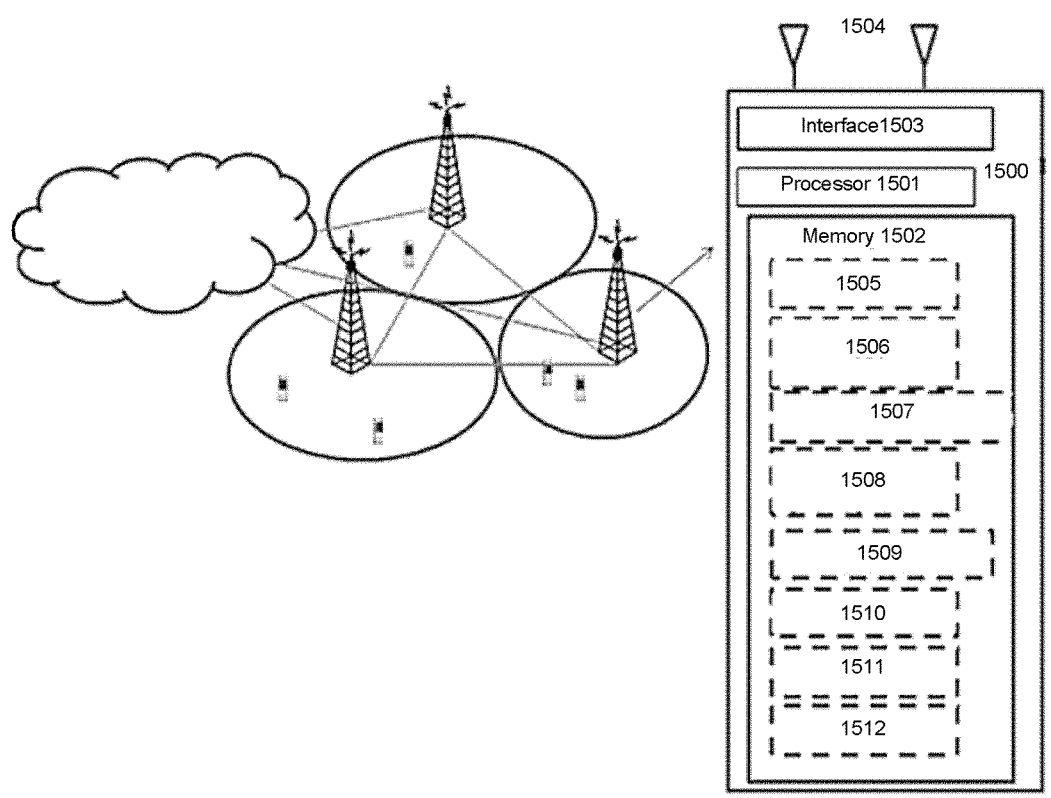
FIG. 15 is a schematic diagram illustrating an exemplary implementation wherein functions of the network device described in conjunction with FIG. 13/14 are performed by a single network device within a wireless network.

FIG. 15 is a schematic diagram illustrating an exemplary implementation wherein functions of the network device 1300/1400 described in conjunction with FIG. 13-14 are performed by a single network device 1500 within a wireless communication network.

Network Device 1500 may, in some embodiments, be an electronic device being communicatively connected to other electronic devices on the network (e.g., other network devices, end-user devices, radio base stations, etc.). In certain embodiments, a network device may include radio access features that provide wireless radio network access to other electronic devices such as UEs. For example, network device 1500 may be an eNodeB in Long Term Evolution (LTE) or other type of base station as well as a radio network controller. Network device (ND) 1500 may store and transmit (internally and/or with other electronic devices over a network) code (which is composed of software instructions and which is sometimes referred to as computer program code or a computer program) and/or data using non-transitory machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals — such as carrier waves, infrared signals). As depicted, network device 1500 includes a processor 1501, a memory 1502, an interface 1503 and an antenna 1504. These components may work together to provide various network device functionality as disclosed hereinabove. Such functionality may include implementing all, or a portion, of the modules depicted in FIG. 15.

The components of the network device 1500 are depicted as single boxes located within a single larger box for reasons of simplicity in describing certain aspects and features disclosed herein. In practice however, the network device 1500 may include multiple different physical components that make up a single illustrated component (e.g., the interface 1503 may include terminals for coupling wires for a wired connection and a radio transceiver for a wireless connection). As another example, the network device 1500 may be a virtual network device in which multiple different physically separate components interact to provide the functionality of network device 1500 (e.g., processor 1501 may include three separate processors located in three separate enclosures, where each processor is responsible for a different function for a particular instance of radio access network device 1500). Alternatively, the same physical components may be used to implement multiple separate instances of the network device (e.g., processor 1501 may execute separate instructions for multiple different instances of a radio access network device). Similarly, network device 1500 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. These components may be dedicated components or they may be shared in a virtualized context. In certain scenarios in which network device 1500 includes multiple separate components (e.g., BTS and BSC components), one or more of the separate components may be shared among several network devices. For example, a single RNC may control multiple NodeBs. In such a scenario, each unique NodeB and BSC pair, may be a separate network device. In some embodiments, network device 1500 may be configured such that some components may be duplicated (e.g., separate memory 1502 for different virtual instances) and some components may be reused (e.g., the same antenna 1504 may be shared by any and all virtual instances).

Processor 1501 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network device 1500 components, such as memory 1502.

Memory 1502 may include non-transitory machine readable storage media (also called computer-readable media) having stored therein software. For instance, memory 1502 may include non-volatile memory containing code to be executed by processor 1501. Because memory 1502 is non-volatile, the code and/or data stored therein can persist even when the network device is turned off (when power is removed). In some instances, while the network device is turned on that part of the code that is to be executed by the processor(s) may be copied from non-volatile memory into volatile memory (e.g., dynamic random access memory (DRAM), static random access memory (SRAM)) of that network device. Interface 1503 may be used in the wired or wireless communication of signaling and/or data to or from network device 1500. For example, interface 1503 may perform any formatting, coding, or translating that may be needed to allow network device 1500 to send and receive data whether over a wired or a wireless connection. In some embodiments, interface 1503 may be coupled to one or more antennas 1504 which may include one or more transceivers for communicating with other similar network devices, with end user equipment and with other network devices. In some embodiments, interface 1503 may include radio circuitry that may receive digital data that is to be sent out to other network devices via a wireless connection. The radio circuitry may convert the digital data into a radio signal having the appropriate parameters (e.g., frequency, timing, channel, bandwidth, etc.). The radio signal may then be transmitted via antennas 1504 to the appropriate recipient(s). The radio circuitry of interface 1503 may in some instances include functionality for linking the Common Public Radio Interface (CPRI) stream and the antenna 1504.

The L1 module 1505 handles uplink and downlink in the physical layer, layer 1 of the protocol stack. In uplink, the L1 module processes antenna data received from the radio circuitry (e.g., over Common Public Radio Interface (CPRI)), which data processing may include removing cyclic prefix, running Fast Fourier Transform (FFT) to extract sub-channels, decoding/demodulating symbols, extracting physical channels and passing user information up to the lower layer of L2 Media Access Control (MAC). Thus, the L1 module 1505 plays a critical role in performing the above-described method 800 which relates to UL reception. In downlink, the L1 module takes user data provided by lower layer of L2 MAC. Examples of tasks that may be performed by the L1 module in downlink may include constructing physical channels, performing turbo coding, scrambling, modulating, layer mapping, pre-coding, frequency mapping, inverse FFT, and cyclic prefix insertion and sending antenna data (e.g., over CPRI) to the interface 1503. To handle this processing, specialized hardware may be used, including accelerators, to form processing chains.

The L2-Sync module 1506 includes the synchronous parts of layer 2 of the protocol stack. The L2-Sync module includes the 3rd Generation Partnership Project (3GPP) sub-layers Medium Access Control (MAC) (including Hybrid Automatic Repeat Request (HARQ)) and Radio Link Control (RLC). The MAC sub-layer may have a separate HARQ entity for each connected UE, and a few additional HARQ entities for common needs such as system information, paging, and random access response. The RLC sub-layer may have a separate RLC entity for each logical channel, corresponding to radio bearers. Downlink and uplink may operate independently of each other, with some signaling forwarded from the uplink to the downlink. Downlink: A task of the L2-Sync module in downlink may be to take Packet Data Convergence Protocol (PDCP) Packet Data Units (PDUs) from a PDCP PDU buffer and build MAC PDUs that are sent to the L1 module. This may be triggered by a transmit order from User Plane Control (UPC) module. In downlink the L2-Sync module may also handle multiplexing of logical channels, HARQ retransmissions, MAC control elements, MAC procedures such as random access, RLC PDU buffering and retransmissions, and RLC status messages. The PDCP PDU buffers may typically be shared between the L2-Async module and the L2-Sync module. If this is not possible, for example, if L2-Async is placed at a different site, a flow control mechanism may be added to transfer PDCP PDUs from the L2-Async module to the L2-Sync module. Uplink: A task of the L2-Sync module in uplink may be to deconstruct MAC PDUs received from the L1 module into PDCP PDUs that are delivered to the L2-Async module. In uplink the L2-Sync module may also handle MAC control elements, MAC procedures such as random access, de-multiplexing of logical channels, RLC PDU buffering, reordering and retransmissions, and RLC status messages. In uplink the L2-Sync module may not be part of a latency critical processing path, but may have a direct impact on the end-to-end packet latency.

The UPC (User Plane Control) module 1507 includes fast radio resource management (RRM) functions that may occur on a per-subframe basis. This may include air-interface resource scheduling, link adaptation (transport format selection), and power control. The UPC module may use input from other modules such as the L1 module and the L2-Sync module, and generate messages to other modules such as the L1 module and the L2-Sync module. The input may include buffer status reports, measurement reports, Channel Quality Indicator (CQI) reports, and HARQ feedback. The messages may be control information sent to the UEs, as well as uplink and downlink scheduling commands sent to the L1 module and the L2-Sync module. The UPC module may thus handle scheduling and optimization problems, involving many UEs and shared resources such as spectrum, power, and hardware.

The L2-Async module 1508 includes the PDCP layer, whose primary tasks may be ciphering, header compression, and integrity protection for signaling. It may also support lossless handover. In downlink, L2-Async module may maintain a PDCP PDU buffer, which is often shared with the L2-Sync module when suitable, as discussed above.

The RRM-C (Radio Resource Management Coordination) module 1509, includes functions to coordinate multiple UPC instances. The RRM-C module may include functions for performing one or more of the following: Coordinated MultiPoint (CoMP) including fast and slow uplink/downlink, Combined Cell, Dual Connectivity, Inter-Cell Interference Coordination (ICIC), enhanced Inter-Cell Interference Coordination (eICIC) and Further enhanced Inter-Cell Interference Coordination (FeICIC). The RRM-C module may take input from the L1 and the L2-Async modules and generate messages to the UPC module.

The UEH (User Equipment Handler) module 1510, includes functions for the handling and control of UE related control plane functions. UEH consists of 3GPP sub-layer Radio Resource Control (RRC). This includes the control of one or more of the following functions: Connection handling, such as setup and release of connections; Mobility handling, such as handover or redirection release; UE Measurement Control; Load Management, such as Inter-Frequency Load Balancing and Offload; and Enhanced Multimedia Broadcast and Multicast Services (eMBMS). The UEH module may also implement the application protocols for communication with a mobility management entity (e.g. S1-AP, M3-AP) and other base stations (e.g. X2-AP). The UEH module may logically have a separate entity for each connected UE, storing all necessary data in a UE Context. Each separate entity may also implement the state machine for running all control-plane features related to a UE, including the necessary coordination between different functions for a specific UE.

The RNH (Radio Network Handler) module 1511, includes functionality to manage logical cells in the radio network on order from an operator. The RNH module may also be responsible for the handling of LRAT specific configuration data on cell and node/device level. This also includes the handling of cell relations and neighbor cell data, such as Evolved Universal Terrestrial Radio Access Network (EUTRAN) neighbor cells and cells belonging to other RATs. The RNH module may also implement a number of Self-Organizing Network (SON) related functions such as automatic handling of neighbor relations (ANR); X2 Handling, i.e. automatic handling of external base station and cells references received from another base station over an interface used for communication between base stations, such as X2; and Mobility Robustness Optimization (MRO), i.e. automatic tuning of mobility related parameters.

The TN (Transport Network) module 1512, includes features for providing the node/device with transport network capabilities based on Internet Protocol (IP) (both IPv4 and IPv6 hosts) for messages with forwarding and protocol termination. Examples of protocols could include Stream Control Transmission Protocol (SCTP), Transmission Control Protocol (TCP), User Datagram Protocol (UDP) and GPRS Tunneling Protocol User Plane, (GTP-U), with support for Security, the protocols to be used over the paths S1, M3, X2 and/or Mul. The TN module may handle the forwarding of TN traffic between Digital Units (DUs) (within the node/device and between node/devices) and management of Site Local Area Networks (LAN) packets forwarding to the Operations and Maintenance (OAM) system. Security may be supported with Internet Protocol Security (IPSec), including Internet Key Exchange (IKE) handling and Access control lists (ACL) for the Site LAN. The TN module may also handle shaping capabilities for overload situations on the transport network when needed. The interaction between the transport and radio network makes it possible for the radio domain to adapt to the actual resource situation in the backhaul network. This is done by extension in the transport network domain, and an interface to the radio domain which makes it possible for the transport network to report the available transport resources and characteristic for specific network path(s) requested by the radio network domain. This can be the available S1 path(s) in the transport network to the core network or X2 path(s) to neighboring cell sites.

Figure 16:
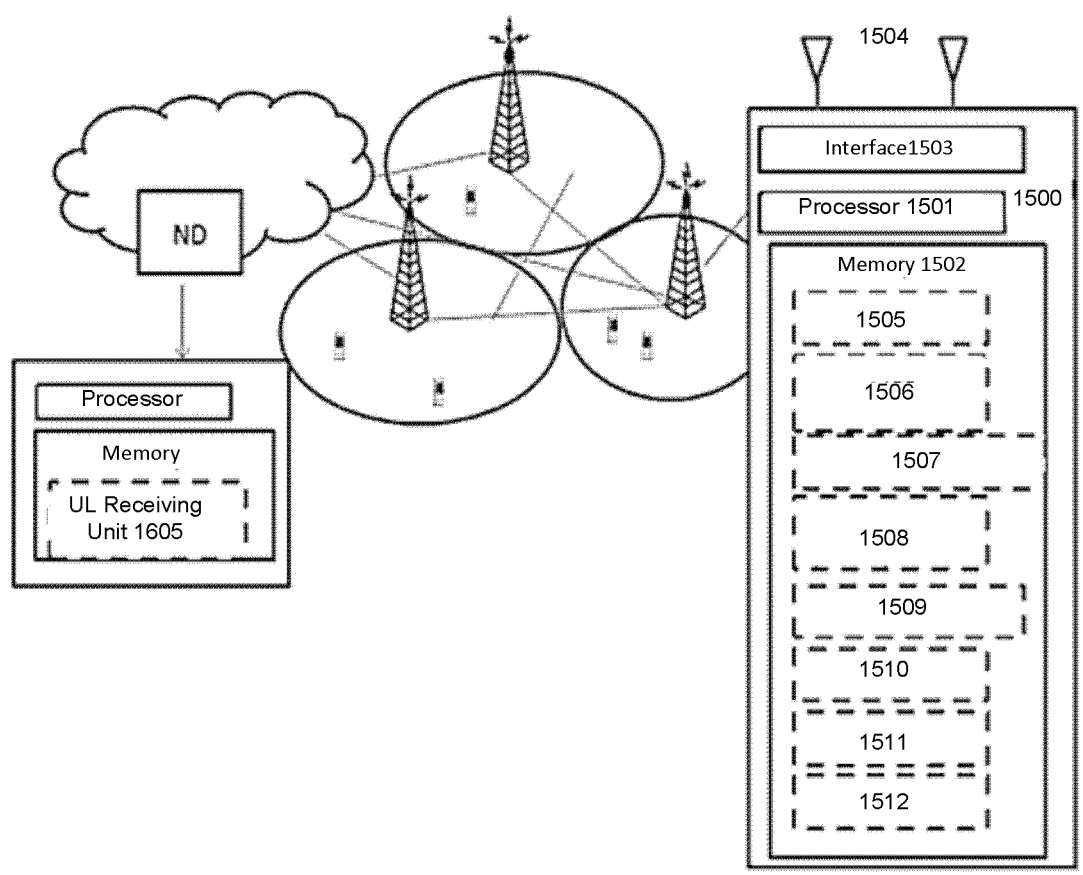
FIG. 16 is a schematic diagram illustrating an alternative implementation wherein functions of the network device described in conjunction with FIG. 13/14 are distributed over two network devices within a wireless network.

As an alternative implementation to that illustrated in FIG. 15, functions of the network device 1300/1400 described in conjunction with FIGS. 13 and 14 may be distributed over two network devices within a wireless communication network as illustrated in FIG. 16.

As depicted, in addition to a network device 1500 which has the same structure and modules as the network device 1300/1400, another network device 1600 separate from the network device 1500 also implements a L1 module 1605 that cooperates with the L1 module 1505 in the network device 1500 for performing UL reception.

In such an implementation, the network device 1600 may be a serving network device with which a terminal device may communicate directly so as to access the network and the network device 1600 may not communicate with the terminal device directly but serves as a UL receiving unit which performs UL reception from the network device 1500. The UL signal received from the terminal device and the pattern specifying a plurality of time points for a terminal device to transmit its UL signal to the network device have been transmitted from the network device 1500 to the terminal device 1600 after receiving the UL signal from the terminal device.

In an embodiment, the network device 1600 detects the UL signal at a time point specified by a pattern, and then identifies that the UL signal comes from the terminal device based on the pattern.

Figure 17:
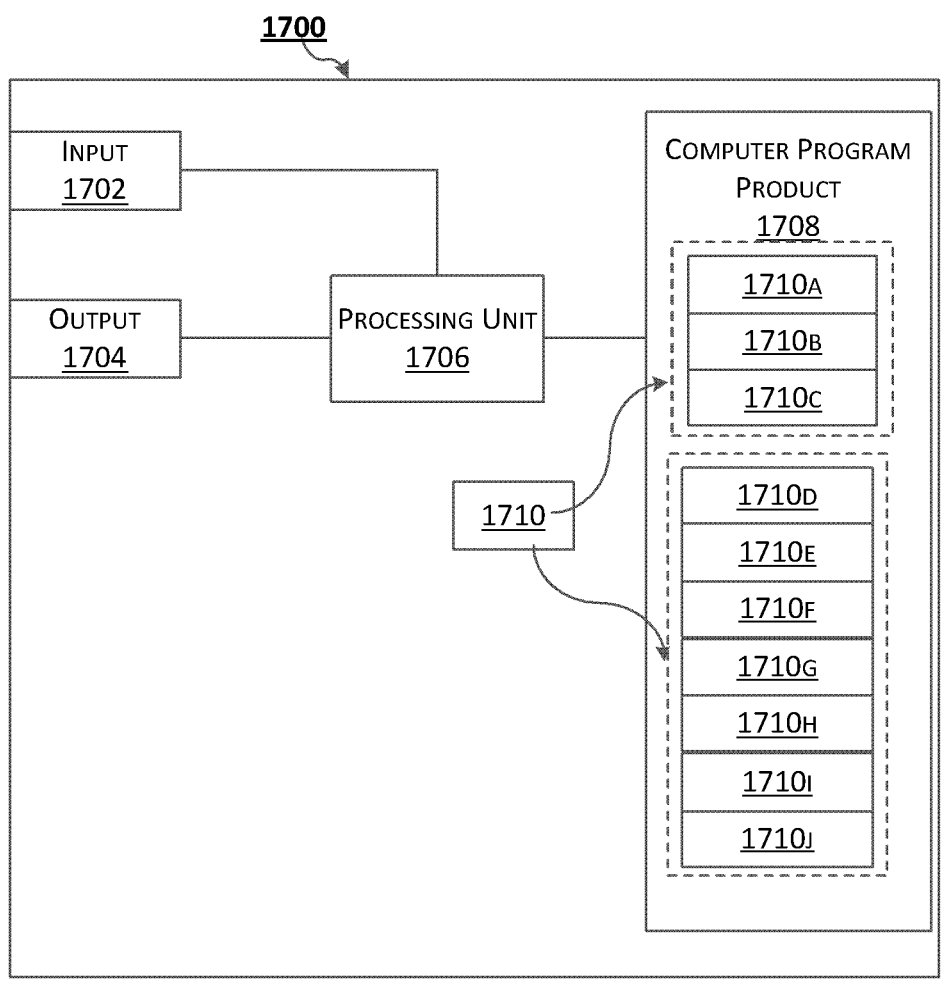
FIG. 17 schematically shows an embodiment of an arrangement 1700 including at least one particular computer program product 1708 according to embodiments of the present disclosure.

FIG. 17 schematically shows an embodiment of an arrangement 1700 including at least one particular computer program product 1708 according to embodiments of the present disclosure. The arrangement 1700 may be used in the terminal device 1100 or the network device 1300 according to the present disclosure. Comprised in the arrangement 1700 are here a processing unit 1706, e.g., with a Digital Signal Processor (DSP). The processing unit 1706 may be a single unit or a plurality of units to perform different actions of procedures described herein. The arrangement 1700 may also include an input unit 1702 for receiving signals from other entities, and an output unit 1704 for providing signal(s) to other entities. The input unit and the output unit may be arranged as an integrated entity or as illustrated in the example of FIG. 11 or FIG. 13.

Furthermore, the at least one computer program product 1708 may be in the form of a non-volatile or volatile memory, e.g., an Electrically Erasable Programmable Read-Only Memory (EEPROM), a flash memory and a hard drive. The computer program product 1708 includes a computer program 1710, which includes code/computer readable instructions, which when executed by the processing unit 1706 in the arrangement 1700 causes the arrangement 1700 and/or the terminal device or the network device in which it is included to perform the actions, e.g., of the procedure described earlier in conjunction with FIGS. 4-7 and/or FIGS. 8-10.

The computer program 1710 may be configured as a computer program code structured in computer program modules 1710A-1710C or 1710D 1710J. Hence, in an exemplifying embodiment when the arrangement 1700 is used in the terminal device 1100, the code in the computer program of the arrangement 1700 includes an obtaining module 1710A, for obtaining a pattern for UL transmission to a network device. The pattern is specific to the terminal device and specifies a plurality of time points for transmitting a UL signal to the network device. The code in the computer program 1710 further includes a transmitting 1710B, for transmitting the UL signal to the network device based on the pattern. The code in the computer program 1710 may include further modules, illustrated as module 1710C, e.g. for controlling and performing other related procedures associated with the terminal device's operations.

In another exemplifying embodiment when the arrangement 1700 is used in the network device 1300, the code in the computer program of the arrangement 1700 includes a detecting module 1710D, for detecting a UL signal at a time point specified by a pattern. The pattern specifies a plurality of time points for a terminal device to transmit its UL signal to the network device. The code in the computer program 1710 further includes an identifying module 1710E, for identifying that the UL signal comes from the terminal device based on the pattern. The code in the computer program 1710 further includes an assigning module 1710F, for assigning the pattern to the terminal device. The code in the computer program 1710 further includes a first transmitting module 1710G, for transmitting an indication of the pattern to the terminal device. The code in the computer program 1710 further includes a second transmitting module 1710H, for transmitting a set of predefined patterns including the pattern to the terminal device. The code in the computer program 1710 further includes a receiving module 1710I, for receiving, from the terminal device, an indication that the terminal device selects the pattern for transmitting its UL signal to the network device. The code in the computer program 1710 may include further modules, illustrated as module 1710J, e.g. for controlling and performing other related procedures associated with the network device's operations.

The computer program modules could essentially perform the actions of the flow illustrated in FIGS. 4-7, to emulate the terminal device 1100, or the actions of the flow illustrated in FIGS. 8-10, to emulate the network device 1300. In other words, when the different computer program modules are executed in the processing unit 1706, they may correspond, e.g., to the units 1110 1120 of FIG. 11 or to the units 1310 1360 of FIG. 13.

Although the code means in the embodiments disclosed above in conjunction with FIG. 17 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the terminal device or the network device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a terminal device, the method comprising:
    obtaining a pattern for uplink (UL) transmission to a network device, the pattern being specific to the terminal device and specifying a plurality of time points for transmitting a UL signal to the network device, wherein the plurality of time points are equally spaced; and
    transmitting the UL signal to the network device based on the pattern, comprising:
        determining a time point from the plurality of time points;
        during a first time period immediately preceding the time point, performing a Channel Clearance Assessment (CCA), failure of which to cause another CCA during a second time period immediately preceding a next time point within the plurality of time points, wherein the next time point is after a back-off period following the first time period, and wherein the CCA is performed iteratively until a CCA success immediately preceding a transmission time point; and
        transmitting the UL signal to the network device at the transmission time point corresponding to the CCA success, wherein the UL signal contains a reference signal as its header.

2. The method according to claim 1, wherein said obtaining the pattern for the UL transmission comprises:
    receiving an indication of the pattern from the network device; and
    determining the pattern from a set of predefined patterns based on the indication.

3. The method according to claim 1, wherein said obtaining the pattern for the UL transmission comprises:
    receiving a set of predefined patterns from the network device; and
    selecting, from the set of predefined patterns, one pattern as the pattern for the UL transmission.

4. A method used in a network device, the method comprising:
    detecting an uplink (UL) signal at a time point specified by a pattern, the pattern specifying a plurality of time points for a terminal device to transmit its UL signal to the network device, wherein the plurality of the time points specified by the pattern are equally spaced;
    identifying that the UL signal comes from the terminal device based on the pattern; and
    suppressing signals from another terminal device to process the identified UL signal from the terminal device, wherein the suppression comprises using a weighting matrix to weight against impact of the another terminal device in channel estimation.

5. The method according to claim 4, further comprising:
    assigning the pattern to the terminal device; and
    transmitting an indication of the pattern to the terminal device.

6. The method according to claim 4, further comprising:
    transmitting a set of predefined patterns including the pattern to the terminal device; and receiving, from the terminal device, an indication that the terminal device selects the pattern for transmitting its UL signal to the network device.

7. A terminal device, the terminal device comprising:
an obtaining circuit configured to obtain a pattern for uplink (UL) transmission to a network device, the pattern being specific to the terminal device and specifying a plurality of time points for transmitting a UL signal to the network device, wherein the plurality of time points are equally spaced; and
a transmitting circuit, coupled to the obtaining circuit, configured to transmit the UL signal to the network device based on the pattern, wherein the transmission comprises:
  determining a time point from the plurality of time points;
  during a first time period immediately preceding the time point, performing a Channel Clearance Assessment (CCA), failure of which to cause another CCA during a second time period immediately preceding a next time point within the plurality of time points, wherein the next time point is after a back-off period following the first time period, and wherein the CCA is performed iteratively until a CCA success immediately preceding a transmission time point; and
  transmitting the UL signal to the network device at the transmission time point corresponding to the CCA success, wherein the UL signal contains a reference signal as its header.

8. The terminal device according to claim 7, wherein said obtaining circuit is further configured to:
receive an indication of the pattern from the network device; and
determine the pattern from a set of predefined patterns based on the indication.

9. The terminal device according to claim 7, wherein said obtaining circuit is further configured to:
receive a set of predefined patterns from the network device; and
select, from the set of predefined patterns, one pattern as the pattern for the UL transmission.

10. A network device, the network device comprising:
a detecting circuit configured to detect an uplink (UL) signal at a time point specified by a pattern, the pattern specifying a plurality of time points for a terminal device to transmit its UL signal to the network device, wherein the plurality of the time points specified by the pattern are equally spaced; and
an identifying circuit, coupled to the detecting circuit, configured to identify that the UL signal comes from the terminal device based on the pattern, to suppress signals from another terminal device to process the identified UL signal from the terminal device, wherein the suppression comprises using a weighting matrix to weight against impact of the another terminal device in channel estimation.

11. The network device according to claim 10, further comprising:
an assigning circuit configured to assign the pattern to the terminal device; and
a first transmitting circuit configured to transmit an indication of the pattern to the terminal device.

12. The network device according to claim 10, further comprising:
a second transmitting circuit configured to transmit a set of predefined patterns including the pattern to the terminal device; and a receiving circuit configured to receive, from the terminal device, an indication that the terminal device selects the pattern for transmitting its UL signal to the network device.

13. A terminal device, the terminal device comprising:
a processor; and
a memory storing instructions that when executed on the processor, cause the terminal device to:
  obtain a pattern for uplink (UL) transmission to a network device, the pattern being specific to the terminal device and specifying a plurality of time points for transmitting a UL signal to the network device, wherein the plurality of time points are equally spaced; and
  transmit the UL signal to the network device based on the pattern, comprising:
    determining a time point from the plurality of time points;
    during a first time period immediately preceding the time point, performing a Channel Clearance Assessment (CCA), failure of which to cause another CCA during a second time period immediately preceding a next time point within the plurality of time points, wherein the next time point is after a back-off period following the first time period, and wherein the CCA is performed iteratively until a CCA success immediately preceding a transmission time point; and
    transmitting the UL signal to the network device at the transmission time point corresponding to the CCA success, wherein the UL signal contains a reference signal as its header.

14. The terminal device according to claim 13, wherein obtainment of the pattern for the UL transmission comprises:
receiving an indication of the pattern from the network device; and
determining the pattern from a set of predefined patterns based on the indication.

15. The terminal device according to claim 13, wherein obtainment of the pattern for the UL transmission comprises:
receiving a set of predefined patterns from the network device; and
selecting, from the set of predefined patterns, one pattern as the pattern for the UL transmission.

16. A network device, the network device comprising:
a processor; and
a memory storing instructions that when executed on the processor, cause the network device to:
  detect an uplink (UL) signal at a time point specified by a pattern, the pattern specifying a plurality of time points for a terminal device to transmit its UL signal to the network device, wherein the plurality of the time points specified by the pattern are equally spaced;
  identify that the UL signal comes from the terminal device based on the pattern; and
  suppress signals from another terminal device to process the identified UL signal from the terminal device, wherein the suppression comprises using a weighting matrix to weight against impact of the another terminal device in channel estimation.

17. The network device according to claim 16, wherein the instructions when executed on the processor further cause the network device to:
assign the pattern to the terminal device; and
transmit an indication of the pattern to the terminal device.

18. The network device according to claim 16, wherein the instructions when executed on the processor further cause the network device to:

transmit a set of predefined patterns including the pattern to the terminal device; and receive, from the terminal device, an indication that the terminal device selects the pattern for transmitting its UL signal to the network device.

19. A non-transitory machine readable medium storing instructions that when executed, cause one or more computing devices to perform:

obtaining a pattern for uplink (UL) transmission to a network device, the pattern being specific to the one or more computing devices and specifying a plurality of time points for transmitting a UL signal to the network device, wherein the plurality of time points are equally spaced; and transmitting the UL signal to the network device based on the pattern, comprising:

determining a time point from the plurality of time points;

during a first time period immediately preceding the time point, performing a Channel Clearance Assessment (CCA), failure of which to cause another CCA during a second time period immediately preceding a next time point within the plurality of time points, wherein the next time point is after a back-off period following the first time period, and wherein the CCA is performed iteratively until a CCA success immediately preceding a transmission time point; and transmitting the UL signal to the network device at the transmission time point corresponding to the CCA success, wherein the UL signal contains a reference signal as its header.

* * * * *